(12) United States Patent
Lavarias

(10) Patent No.: US 8,783,749 B2
(45) Date of Patent: Jul. 22, 2014

(54) LONG REACH FISHING ROD RETRIEVER

(76) Inventor: John Lavarias, Westminster, CA (US)

( * ) Notice: Subject to any disclaimer, the term of this patent is extended or adjusted under 35 U.S.C. 154(b) by 37 days.

(21) Appl. No.: 13/539,634

(22) Filed: Jul. 2, 2012

(65) Prior Publication Data

US 2014/0001785 A1 Jan. 2, 2014

(51) Int. Cl.
*A01K 97/00* (2006.01)
*B25J 1/04* (2006.01)

(52) U.S. Cl.
USPC .......................................... 294/211; 294/209

(58) Field of Classification Search
USPC .............. 43/21.2, 25, 22, 54.1; 294/209, 210, 294/211, 143; 211/70.8; 248/68.1
See application file for complete search history.

(56) References Cited

U.S. PATENT DOCUMENTS

| | | | |
|---|---|---|---|
| 2,293,305 A | 8/1942 | Oldham | |
| 2,309,350 A | 1/1943 | Nanasko | |
| 2,311,823 A | 2/1943 | Gaskill | |
| 2,506,912 A * | 5/1950 | Augustine | 43/21.2 |
| 2,523,356 A | 9/1950 | Cherry | |
| 2,851,813 A | 9/1958 | Gugliotta | |
| 3,204,899 A * | 9/1965 | Danielewicz | 248/514 |
| 3,618,068 A * | 11/1971 | Sloan | 43/17 |
| 3,862,508 A * | 1/1975 | Morgan | 43/17 |
| 3,945,143 A * | 3/1976 | Schmitt, Sr. | 43/17 |
| 5,797,554 A * | 8/1998 | Atherton et al. | 242/316 |
| 2002/0043014 A1* | 4/2002 | Kondash | 43/17 |
| 2003/0159325 A1* | 8/2003 | Templeman et al. | 43/15 |
| 2003/0217500 A1* | 11/2003 | Ernst | 43/21.2 |
| 2006/0086883 A1* | 4/2006 | Moses | 248/528 |
| 2011/0233161 A1 | 9/2011 | Gaar | |

FOREIGN PATENT DOCUMENTS

GB 0233161 8/1990

* cited by examiner

*Primary Examiner* — Paul T Chin
(74) *Attorney, Agent, or Firm* — Fulwider Patton LLP

(57) ABSTRACT

An elongated body to engage the underside of and upwardly and outwardly angled fishing rod and including opposited extremities formed, respectively with a cradle and a fork projecting laterally in one direction for respective engagement with a reel and the body of the rod. A handle angles downwardly and outwardly from the opposite side.

18 Claims, 4 Drawing Sheets

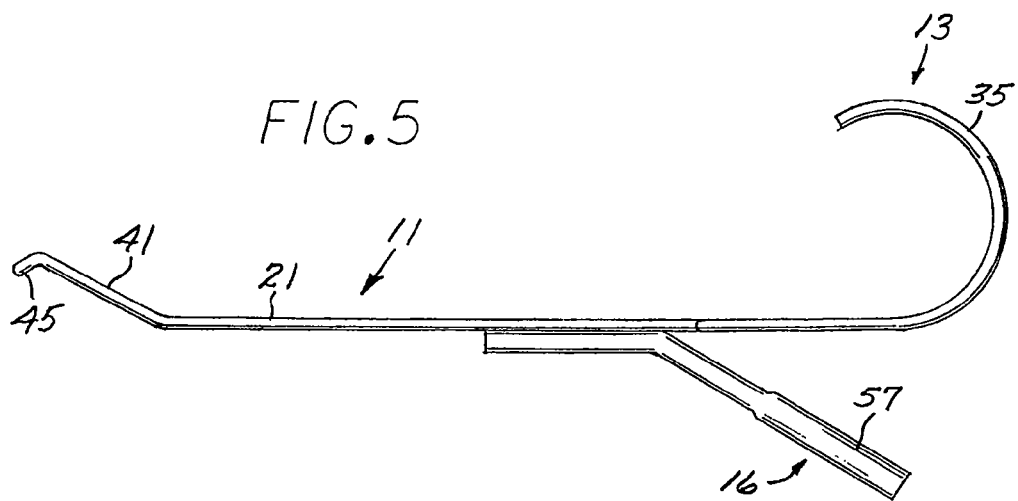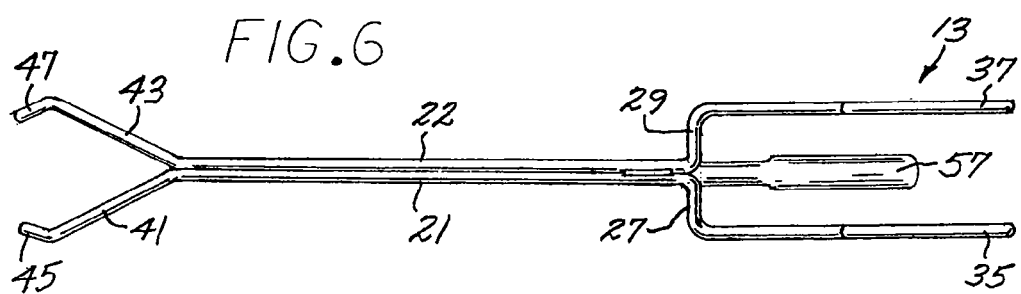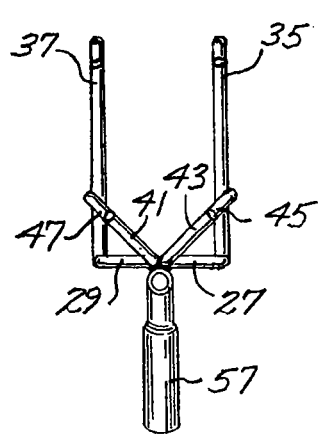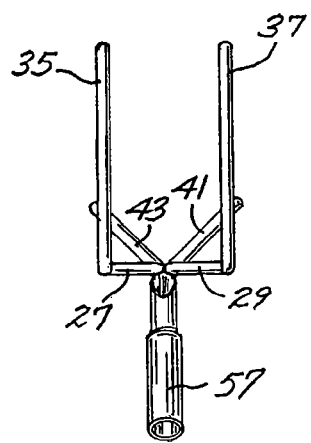

LONG REACH FISHING ROD RETRIEVER

BACKGROUND OF THE INVENTION

1. Field of the Invention

The present invention relates to fishing and, particularly fishing from a boat having fishing rods mounted in elevated holders.

2. Description of the Prior Art

Fishing is a very popular activity around the world, both commercially and for pleasure. Much of the fishing in large bodies of fresh or salt water is conducted from boats.

Many boats have an elevated second deck above a tourist deck and typically several fishing rods are provided for fisherman on the tourist deck. The elevated deck typically terminates in opposite edges spaced inboard above the gunnels of the lower deck, as well as a rear edge spaced forward of the stern. In effort to minimize clutter and maintain organization of the fishermen's rods, holders, sometimes referred to "Rocket Launchers" may be mounted to the aft end or sides of the upper deck. These holders are normally in the form of open top, upwardly opening and outwardly angled tubular devices that sometimes include upwardly opening slots in the walls thereof for receipt of a mounting stem of a reel on the fishing rod.

When a promising fishing site is approached, the ship's captain or deck hands may notify the fishermen of the upcoming activity and there is then oftentimes a flurry of activity seeking to quickly retrieve the fishing rods in order to participate in the early casts into a school of fish. This often results in excited activity by the fishermen and/or deck hands which sometimes results in the fishermen or deckhands climbing up on the gunnels of the lower deck and reaching up and inboard endeavoring to retrieve the fishing rod(s) from the respective holders. This can place the full load of the weight of the rod on the outreached arm, oftentimes loading the back unevenly and subjecting the deckhand to lower back injury.

Also, on many occasions the gunnels of the boat are damp or wet from waves or sea moisture thus creating a dangerous condition for deckhands crawling up on the gunnels to retrieve the fishing rods, particularly in uneven seas. It has long been recognized that there are typically no tools onboard for retrieval of the fishing rods thus inviting the deckhand to, in reaching upwardly and inboard for the rods to sometimes unevenly load his or her back thus, causing back injuries and/or slipping or stumbling from the retrieval position thus resulting in injuries, oftentimes resulting in serious pain and, all too often, loss of work time.

In the past, many different devices have been proposed for mounting fishing rods for different purposes, particularly for holding a rod on a stake during the fishing activity for quick retrieval in the event of a unsuspecting fish takes the bait.

Devices of this type are shown in a number of different prior art patents, including U.S. Pat. No. 2,309,350 to Nasko, U.S. Pat. No. 2,311,823 to Gaskill, U.S. Pat. No. 2,506,912 to Augestine, U.S. Pat. No. 2,523,356 to Cherry, UK Patent Publication No. 227635 and U.S. Pat. No. 2,293,305 to Oldham. While such devices provide convenient cradles or the like to support a rod while fishing, none are constructed to engage an elevated, upwardly and outwardly angled fishing rod for reliable retrieval from an overhead location.

One device proposed seeking to solve the problem includes an elongated telescopical rod including a L-shaped or F-shaped cleat for engaging under a stem of a spinning reel and including at the distal end a loose spiral spring which, upon rotation of the rod, is intended to engage the body of the fishing rod to facilitate retrieval. A device of this type is shown in U.S. Patent Publication No. 2011/02331612 to Gaar. Such a device, while offering some utility, suffers the shortcoming that the use and operation would require unusual dexterity and eyesight for a deckhand to quickly engage the device, particularly under inclement conditions and rocking of a boat in stormy seas.

SUMMARY OF THE INVENTION

The present invention includes a vertically elongated body formed on its respective opposite extremities with a cradle and a fork projecting in one lateral direction and formed centrally with a handle device projecting downwardly in the opposite lateral direction. The cradle includes spaced apart tines curving in the one lateral direction and opening toward the fork.

BRIEF DESCRIPTION OF THE DRAWINGS

FIG. 5 is a left side view of the retriever shown in FIG. 1;

FIG. 6 is a top plan view thereof;

FIG. 7 is a left hand view of the retriever shown in FIG. 1, in enlarged scale;

FIG. 8 is a right hand end view of the retriever shown in FIG. 1, in enlarged scale;

DETAILED DESCRIPTION OF THE PREFERRED EMBODIMENT

Figure 1:
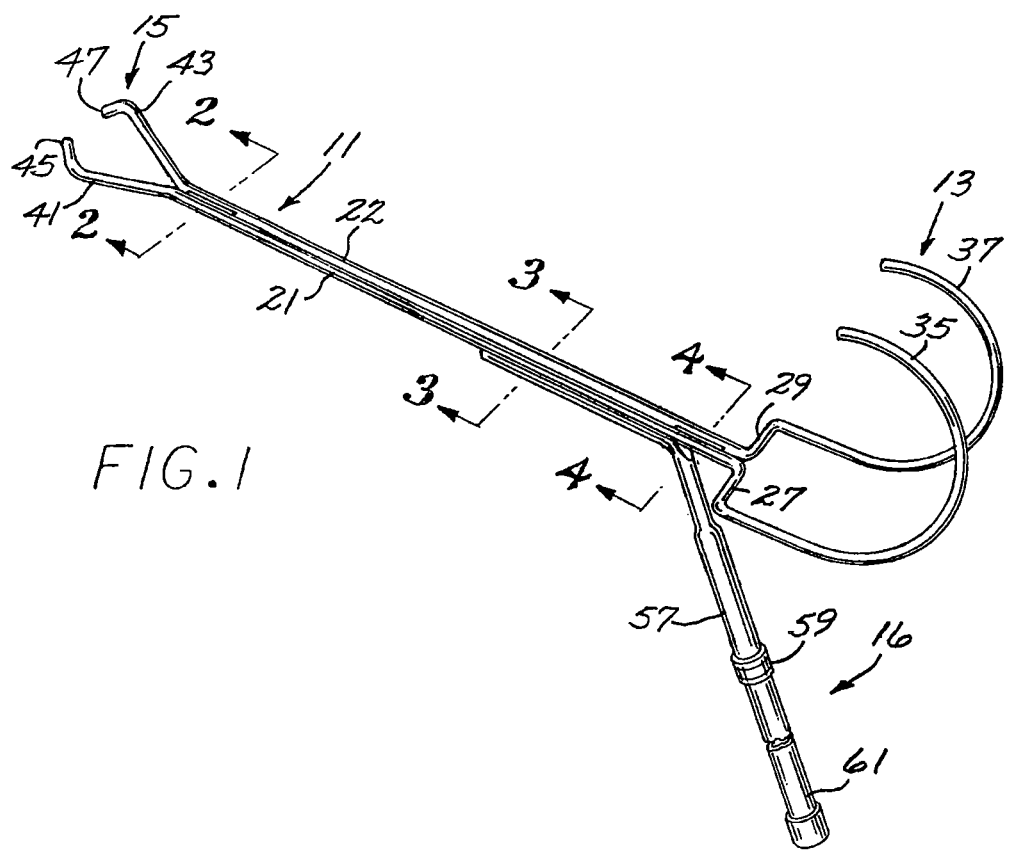
FIG. 1 is a perspective view showing the long reach fishing rod retriever of my present invention.
Figure 2:
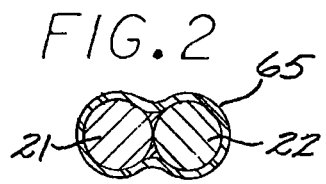
FIGS. 2, 3, and 4 are transverse sectional views, in the large scales, taken along the respective lines 22, 33 and 44 of FIG. 1.
Figure 3:
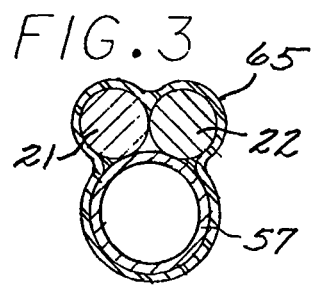
Figure 4:
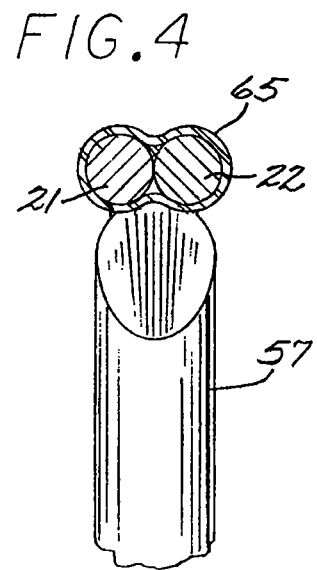
Figure 9:
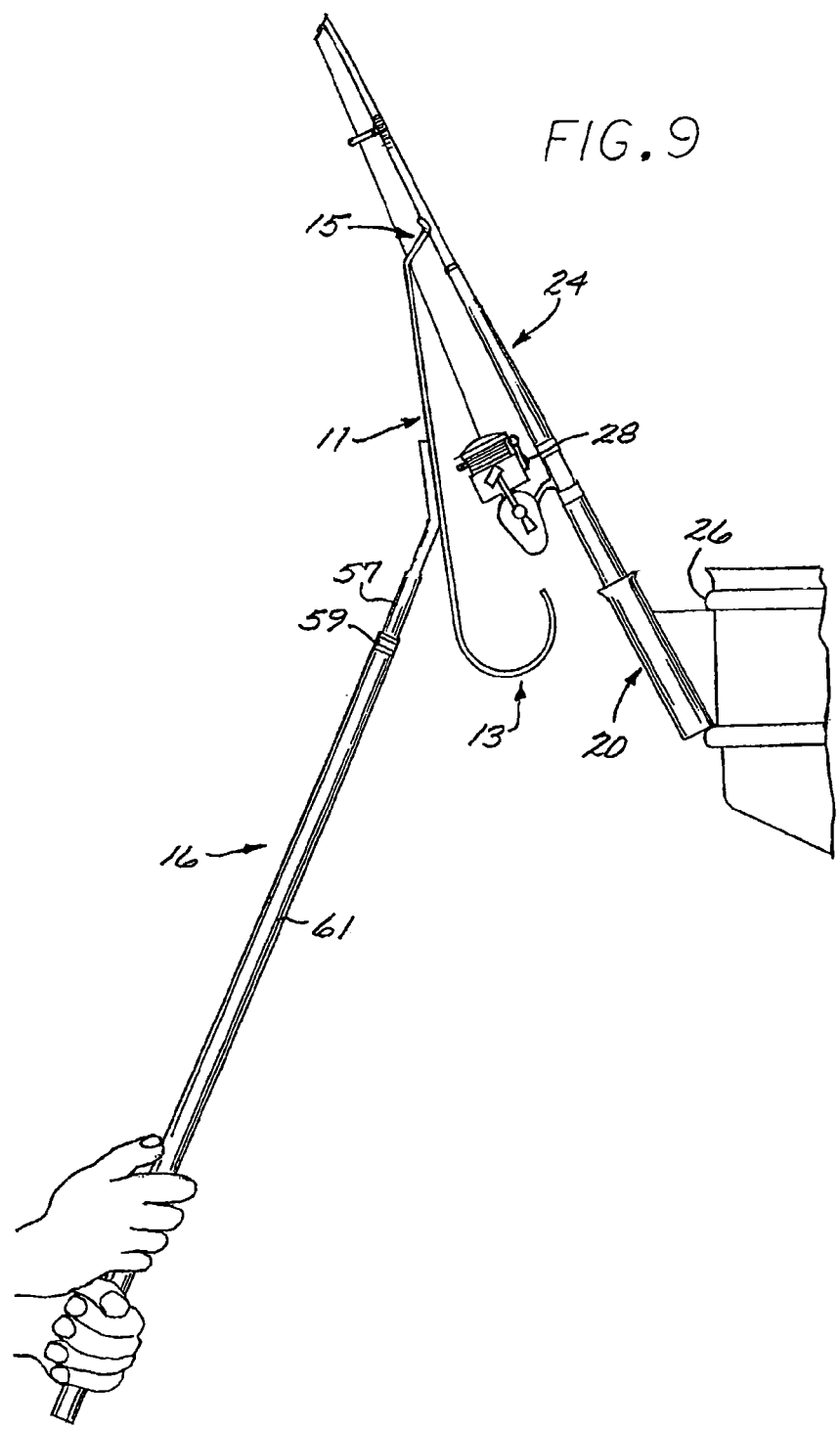
FIG. 9 is a front view in reduced scale of the retriever shown in FIG. 1 utilized to retrieve a fishing rod.
Figure 10:
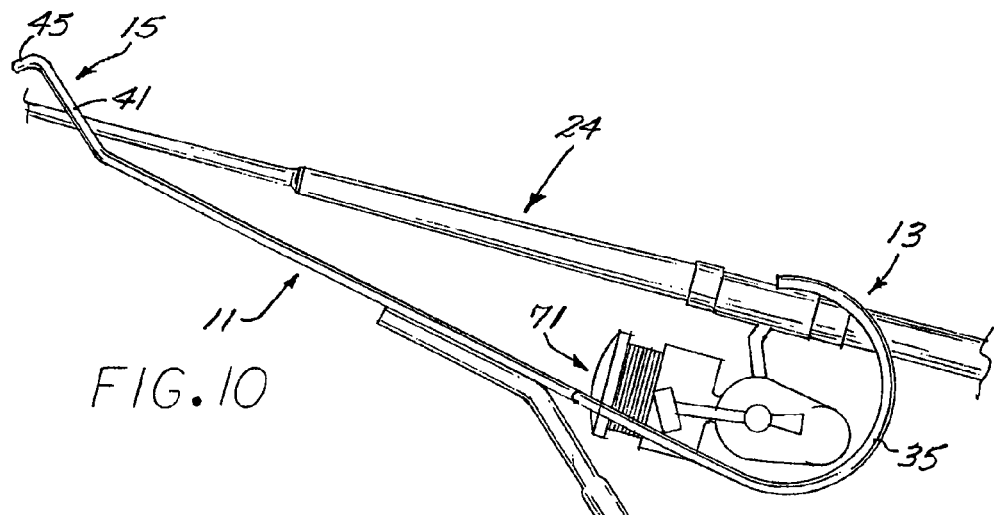
FIG. 10 is a front view of the retriever shown in FIG. 9, but in a large scale.
Figure 11:
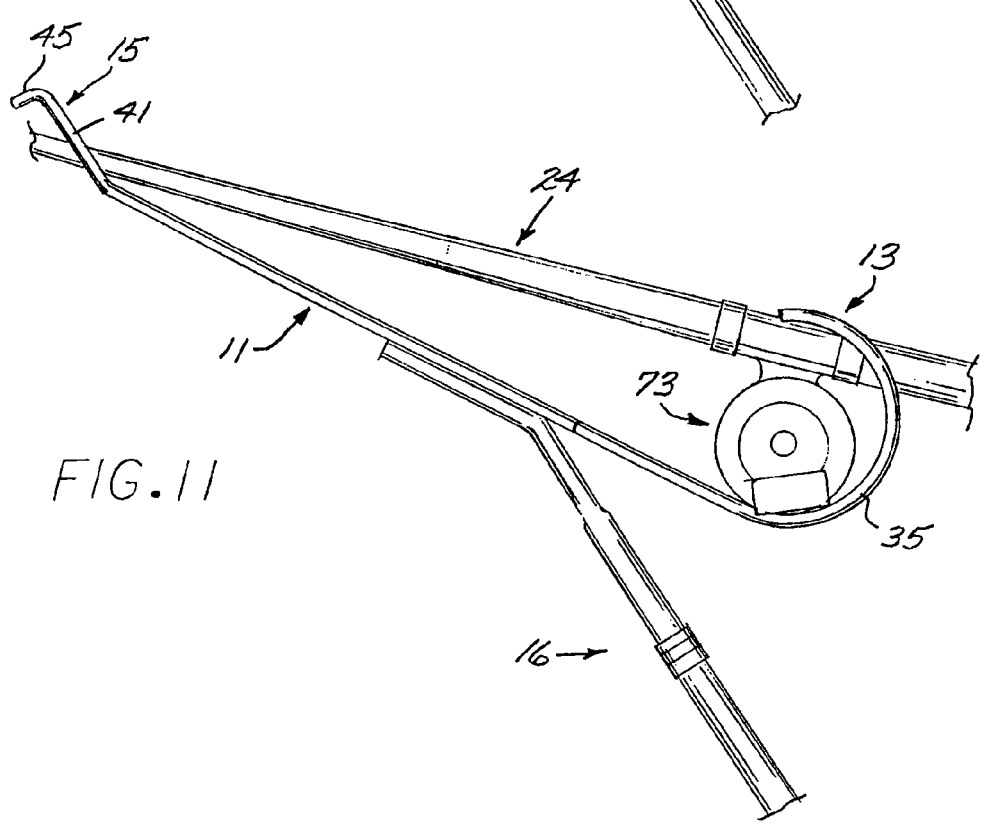
FIG. 11 is a side view of the retriever shown in FIG. 9, shown in large scale, but utilized to retrieve a rod with a casting reel.

Referring to FIGS. 1 and 9, the long reach fishing rod retriever of the present invention includes, generally, an elongated frame 11 formed at one end with a cradle, generally designated 13, projecting in one lateral direction and opening forwardly. Formed at the opposite end of the elongated frame 11 is a fork, generally designated 15, which is formed of a relatively wide opening for cradling the body of the rod as shown in FIGS. 10 and 11.

The frame 11 may be constructed of any desirable material such as plastic or corrosion resistant metal such as aluminum or stainless steel. In the preferred embodiment the frame is constructed of stainless steel and includes elongated rods 21 and 22 having overall lengths of about 17-24 inches. The rods are bent at the rear extremities to project laterally outwardly forming respective lateral runs 27 and 29 and are then bent to project further rearwardly forming respective linear runs 31 and 33 and are then curved laterally in one direction to form respective large diameter loops 35 and 37. The loops 35 and 37 may have a diameter of about 3-6 inches to provide for a robust opening for convenient hooking over reels of various different configurations and sizes.

The fork 15 is formed at the forward end and is constructed of a pair of tines 41 and 43 which project longitudinally and angle outwardly away from one another at respective angles of about 15° to the longitudinal axis and bend downwardly, forwardly and inwardly to form a respective retainers fingers 45 and 47 at the free extremities. The tines of the fork may have a maximum bite of between 2 and 4 inches and preferably about 3 inches.

In practice, my retriever includes a handle device, generally designated 51, which is in the form of a tube 53 mounted to the underside of the rods 21 and 22 and extends longitudinally there-along to turn downwardly at an angle of about 15° to the axis of the frame 11 and opens into a downwardly opening enlarged tube 57. The tube 57 mounts a coupling 59 for receipt of a conventional pole 61 included on many fishing boats to thus provide for a relatively long reach configuration.

In my preferred embodiments, I provide a protective and cushioning coating 65 which may be a rubberized material over the retriever to thus provide weather protection and cushioning in the retrieval of a fishing rod 24.

In operation, it will be appreciated that the long reach retrieval device may be stored onboard a boat for ready access. As a fishing area is approached, the deckhand may retrieve the retriever device and couple the pole 61 to the handle device 51 as shown in FIGS. 1 and 9.

The deckhand may then stand on the tourist deck and reach upwardly with the pole 61 to access a fishing rod 24 supported in a holder 20 elevated on the upper deck 26.

The outwardly and laterally angle rod 24 may be easily accessed from the underside with the loops 35 and 37 forming the cradle 13 engaged underneath the reel 28 as shown in FIG. 10 to thus engage the underside of the reel on opposite sides of the rod handle and in preparation to lift the rod itself. Concurrently, the rather robust lateral reach of the fork 15 will be engaged with the underside of the rod body, it being appreciated that the retainers 45 and 47 will facilitate access to the underside of the rod body and act as somewhat of a funnel to funnel the rod into the bite of the fork for support thereof.

As will be understood by those skilled in the art, the rod may then be conveniently lifted as shown in FIGS. 9 and 10 to be lifted out of the holder 22 and balanced firmly and reliably on my retriever to be lowered by the deckhand for retrieval and delivery to the fisherman.

It will be appreciated by those skilled in the art, with the configuration of my retriever, it is equally applicable to retrieval of rods incorporating numerous different configurations of reels such as the casting reel 71 shown in FIG. 11. In that regard, it will be appreciated that the loops 35 and 37 will be hooked over the opposite ends of the spool of the casting reel 71 for convenient retrieval.

From the foregoing, it will be appreciated that my retriever provides an economical and reliable means for retrieving fishing rods form elevated holders and is economical to manufacture and will provide a long and trouble free life.

It will be apparent from the foregoing that while particular forms of the invention have been illustrated and described, various modifications can be made without departing from the spirit and scope of the invention. Accordingly, it is not intended that the invention be limited, except as by the appended claims.

I claim:

1. A long reach fishing rod device for retrieving an outwardly and upwardly angled fishing rod from an overhead holder, the rod having a reel above the holder and the device comprising:
   a frame including an elongated body to engage on the underside of the rod and having a cradle mounted on one end thereof and a fork mounted on the opposite end thereof;
   the cradle configured with at least one open loop projecting laterally in one lateral direction form the body toward the rod to engage the reel;
   the fork opening in the one lateral direction for engaging the body of the fishing rod;
   a handle device projecting downwardly and laterally from the body in the direction opposite the one lateral direction to be grasped by a user to reach upwardly to the rod, engaging the loop under the reel and the fork over the body of the rod for lifting upwardly to raise the rod upwardly to disengage from the holder.

2. The long reach fishing rod retrieval device of claim 1 wherein:
   the cradle includes a pair of laterally spaced apart rods defining respective loops.

3. The long reach fishing rod retrieval device of claim 1 wherein:
   the loop is formed to define substantially half a circle.

4. The long reach fishing rod retrieval device of claim 1 wherein:
   the cradle includes a pair of rods joined together and formed to first project laterally in opposite directions away from one another and then project longitudinal of the frame and then turning laterally in the one direction to form respective half circles.

5. The long reach fishing rod retrieval device of claim 1 wherein:
   the fork includes a pair of rods projecting longitudinally away from the cradle and angling distally and laterally in the one lateral direction to form respective tines projecting at an angle of substantially 15 degrees to the longitudinal axis.

6. The long reach fishing rod retrieval device of claim 5 wherein:
   the tines are formed at their respective ends with fingers projecting distally and angling in the lateral direction opposite the one lateral direction.

7. The long reach fishing rod retrieval device of claim 6 wherein:
   the fingers angle inwardly toward one another.

8. The long reach fishing rod retrieval device of claim 1 that includes:
   a pair of elongated rods connected together to form the frame and configured at the one end to project laterally from one another and then turning to project distally to then curve laterally in the one direction and back on one another to form respective open loops defining the cradle device.

9. The long reach fishing rod retrieval device of claim 1 that includes:
   a cushioning coating on the frame, loop and fork.

10. The long reach fishing rod retrieval device of claim 1 wherein:
    the fork is configured with tines angling distally outwardly and away from one another to form a bite having a maximum width of between two and four inches.

11. The long reach fishing rod retrieval device of claim 2 wherein:
    the loop is configured with diameters of between 3 and 6 inches.

12. The long reach fishing rod retrieval device of claim 1 wherein:
    the fork is formed with tines diverging distally from one another and have a maximum bite of between 2 and 4 inches.

13. The long reach fishing rod retrieval device of claim 12 wherein:

the cradle is formed with at least one loop having a diameter between 3 and 6 inches.

14. A long reach rod retrieval device for retrieving an upwardly and outwardly angled fishing rod from an overhead holder, the rod having a reel above the holder and the device comprising:
   a frame including a pair of juxtaposed rods projecting longitudinally upwardly and formed at the lower extremity to angle outwardly away from one another and turn rearwardly to form a pair of laterally spaced apart loops defining a cradle for hooking over the reel;
   the rods further formed at their upper extremity to angle outwardly away from one another to form a pair of tines defining a fork, the respective tines being turned downwardly and inwardly toward one another at the free extremity of the times to define respective fingers;
   and a tube mounted to the bottom side of the rods and formed with a downwardly and rearwardly angled coupling for receipt of a pole handle.

15. A long reach fishing rod device for retrieving an upwardly and outwardly angled fishing rod from an overhead holder, the rod having a reel disposed above the holder and the device comprising:
   an elongated frame projecting upwardly along the rod and configured at its rear extremity with a pair of spaced apart loops defining a cradle for receiving the reel;
   the device further formed at the upper extremity with a pair of tines angling upwardly and outwardly away from one another and then turn downwardly to form respective fingers for retaining the rod in the fork; and
   a handle device mounted to the underside of the frame.

16. The long reach fishing rod retrieval device of claim 14 wherein:
   the tube is rigidly mounted to the bottom side of the rods to support the rods against the mount relative to the tube.

17. The long reach fishing rod retrieval device of claim 15 wherein:
   the handle device is rigidly cemented to the underside of the frame.

18. A long reach fishing rod device for retrieving an outwardly and upwardly angled fishing rod from an overhead holder, the rod having a reel above the holder and the device comprising:
   a frame including an elongated body to engage on the underside of the rod and having a cradle mounted on one end thereof and a fork mounted on the opposite end thereof;
   the cradle configured with at least one open loop formed to define a half circle and projecting laterally in one lateral direction form the body toward the rod to engage the reel;
   the fork opening in the one lateral direction for engaging the body of the fishing rod;
   a handle device projecting downwardly and laterally from the body in the direction opposite the one lateral direction to be grasped by a user to reach upwardly to the rod, engaging the loop under the reel and the fork over the body of the rod for lifting upwardly to raise the rod upwardly to disengage from the holder.

\* \* \* \* \*